(12) United States Patent
Huang

(10) Patent No.: US 6,931,136 B2
(45) Date of Patent: Aug. 16, 2005

(54) INFRARED EMITTER

(75) Inventor: Shu-Chun Huang, Taipei (TW)

(73) Assignee: Astro System Inc., Taipei (TW)

( * ) Notice: Subject to any disclaimer, the term of this patent is extended or adjusted under 35 U.S.C. 154(b) by 100 days.

(21) Appl. No.: 10/698,523

(22) Filed: Nov. 3, 2003

(65) Prior Publication Data

US 2005/0094819 A1 May 5, 2005

(51) Int. Cl.$^7$ .............................. H04B 3/00; H04B 5/00; H04R 27/00; H04R 5/02; H04R 1/10
(52) U.S. Cl. ..................... 381/77; 381/309; 381/311; 381/74; 381/2; 381/85; 381/9; 381/1; 455/41.1; 455/41.2
(58) Field of Search .............................. 381/77–85, 8–9, 381/1, 309, 311, 10, 74, 120, 123, 126–127; 700/94; 455/41.1–41.2, 42; 398/121

(56) References Cited

U.S. PATENT DOCUMENTS

2003/0210796 A1 * 11/2003 McCarty et al. .............. 381/81

* cited by examiner

*Primary Examiner*—Laura A. Grier
(74) *Attorney, Agent, or Firm*—Dennison, Shulta, Dougherty & MacDonald

(57) ABSTRACT

An infrared emitter comprises a preamplifier, an infrared RF emitter, an infrared channel controller and a photodiode emitting-medium. With the emitter, by switching between two channels with an infrared channel controller, and by the mode of arrangement of a plurality of infrared emitting diodes and two Darlington amplifying circuits on the parts in a photodiode emitting-medium, crosstalk disturbance during transmitting carrier waves to a wireless earphone is inhibited. The emitter is applied to industries of audio/video playing, car audio/video equipment and hi-fi equipment.

5 Claims, 6 Drawing Sheets

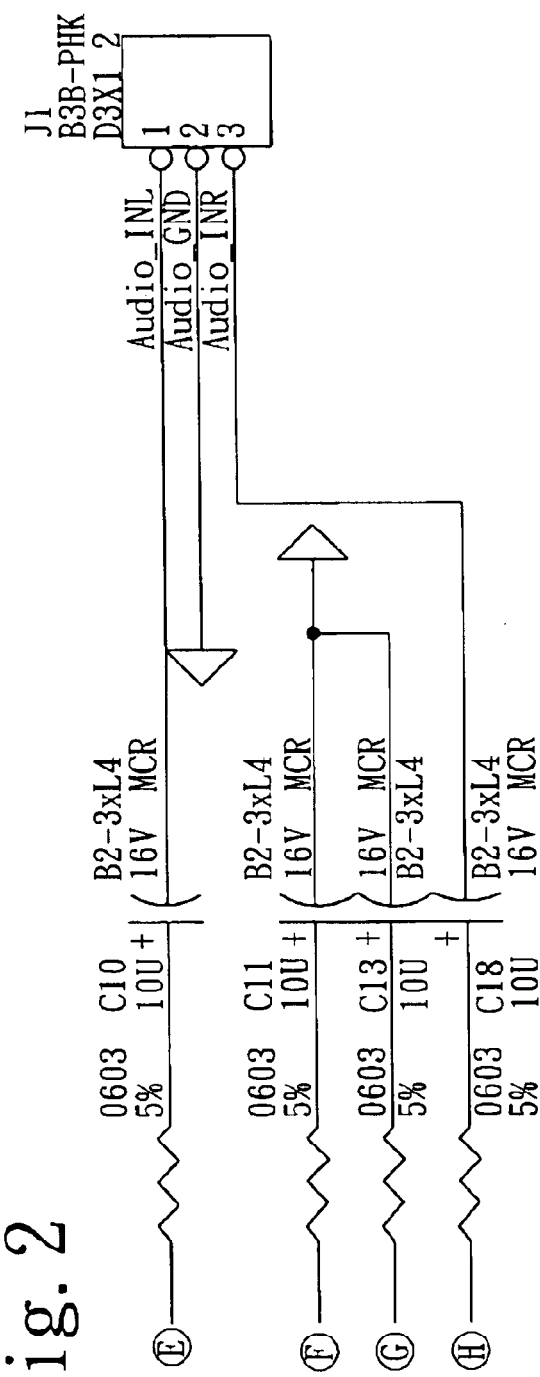

INFRARED EMITTER

BACKGROUND OF THE INVENTION

1. Field of the Invention

The present invention is related to an infrared emitter, and especially to an infrared emitter taking advantage of the mode of arrangement of a plurality of infrared emitting diodes in a photodiode emitting-medium to inhibit disturbance of crosstalk, the emitter is applied to industries of audio/video playing, car audio/video equipment and hi-fi equipment.

2. Description of the Prior Art

The living standards of the people in the world are continuously elevated, people think more and more highly of the life of leisure and the quality of life. The fond of enjoyment of audio-video amusements of people are extremely eager as to have specific spaces for audio-video amusements in their homes in order to enjoy acoustic and optic appreciations of as those used to be provided only in the highest class for a national music hall. While audio-video equipment for providing audio-video amusements can not only give the viewers/listeners the images of clear pictures to satisfy acoustic and optic feelings, but to provide necessary emergence of sounds; it is always the goal of the manufacturers of the art to satisfy acoustic feeling of listeners in enjoying natural as well as clear sounds.

Manufacturers of the art nowadays use two infrared RF emitters to receive the sounds from left sound channel and right sound channel, then simultaneously make transmission of the amplified sounds of the left sound channel and right sound channel in the mode of FM carrier wave, and lastly, have the sounds of the left sound channel and right sound channel transmitted to wireless earphones by means of Darlington amplifying circuits in the photodiode emitting-media and 8 infrared diodes arranged on the parts of the photodiode emitting-media.

The above stated mode of transmission has the following flaws:

1. It can create a phenomenon of triggering among different emitting frequencies to in turn create crosstalk, i.e., during the transmission process, signal sources with different frequencies are heard to have impure sounds not from the emitter. For example, a listener listening to a first channel hears the sounds from a second channel. This is crosstalk created by ununiform distribution of energy of frequency of the light in the air.
2. The other way is to use two infrared RF emitters and 8 infrared diodes to inhibit the problem of crosstalk; the design of circuitry for them is more complicated, and the cost of production is high that does not meet the tendency for electronic products to be light, thin and small.

In view of the above stated, the present invention is developed to overcome the conventional flaws.

SUMMARY OF THE INVENTION

The main objective of the present invention is to provide an infrared emitter using the mode of arrangement of a plurality of infrared emitting diodes and Darlington amplifying circuits on the parts of a photodiode emitting-medium to inhibit disturbance of crosstalk during transmitting carrier waves, and the cost of production is lowered to meet the requirements that electronic products are to be light, thin and small.

In order to achieve the above objective of the present invention, the infrared emitter of the present invention has:

a preamplifier of which one end receives the input source of sounds of left sound channel and right sound channel, the other end emits the sounds of the left sound channel and the right sound channel;

an infrared RF emitter including a channel A, a channel B and two set of mixers; the channel A includes a left sound channel of 2.3 MHz and a right sound channel of 2.8 MHz, the channel B includes a left sound channel of 3.2 MHz and a right sound channel of 3.8 MHz; one end of the infrared RF emitter is used to receive amplified sounds of the left sound channel and right sound channel of the preamplifier; the other end is used to emit the sounds of the left sound channel and the right sound channel wirelessly in a mode of FM carrier wave;

an infrared channel controller connecting with the infrared RF emitter for switching between the channel A and the channel B in the infrared RF emitter;

and a photodiode emitting-medium to receive and emit the sounds of the channel A and the channel B emitted from the infrared RF emitter, the photodiode emitting-medium includes two Darlington amplifying circuits and four diodes A, B, C and D, wherein the diodes A, B are infrared emitting diodes for left sound channel, and the diodes C, D are infrared emitting diodes for right sound channel; one of the abovementioned Darlington amplifying circuits is juxtaposed with the infrared emitting diodes A, C, the other of the Darlington amplifying circuits is juxtaposed with the infrared emitting diodes B, D; and the infrared emitting diode A is of 2.3 MHz, the infrared emitting diode B is of 2.8 MHz, the infrared emitting diode C is of 3.2 MHz, while the infrared emitting diode D is of 3.8 MHz. Thereby, crosstalk phenomenon of abnormal channels can be overcome by switching between the channel A and the channel B with the infrared channel controller and by the mode of arrangement of a plurality of infrared emitting diodes on the parts in the photodiode emitting-medium, as well as by using two set of mixers to control the respective energy adjustment of the diodes A and B (2.3 MHz, 2.8 MHz), or of the diodes C and D (3.2 MHz, 3.8 MHz).

The present invention will be apparent after reading the detailed description of the preferred embodiment thereof in reference to the accompanying drawings.

BRIEF DESCRIPTION OF THE DRAWINGS

FIG. 2 includes FIG. 2A and FIG. 2B which show circuit diagrams of a preamplifier and are connected with each other, wherein, FIG. 2B is a circuit diagram of the other part of the preamplifier of the infrared emitter of the present invention;

FIG. 3 includes FIG. 3A, FIG. 3B and FIG. 3C which include an infrared channel controller, an infrared RF emitter and a photodiode emitting-medium, and are mutually connected, wherein.

DETAILED DESCRIPTION OF THE PREFERRED EMBODIMENT

Figure 2A:
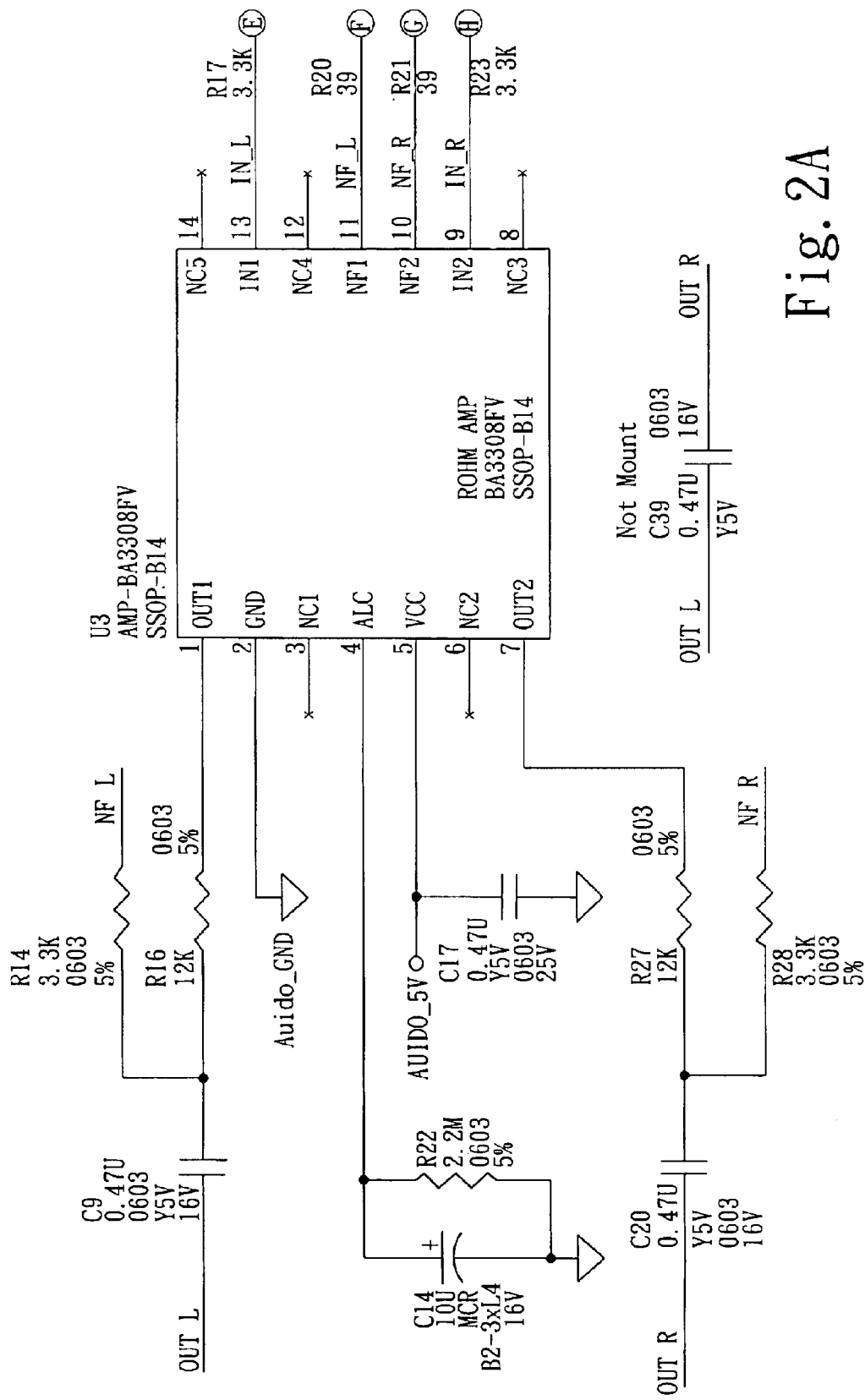
FIG. 2A is a circuit diagram of part of the preamplifier of the infrared emitter of the present invention.
Figure 3A:
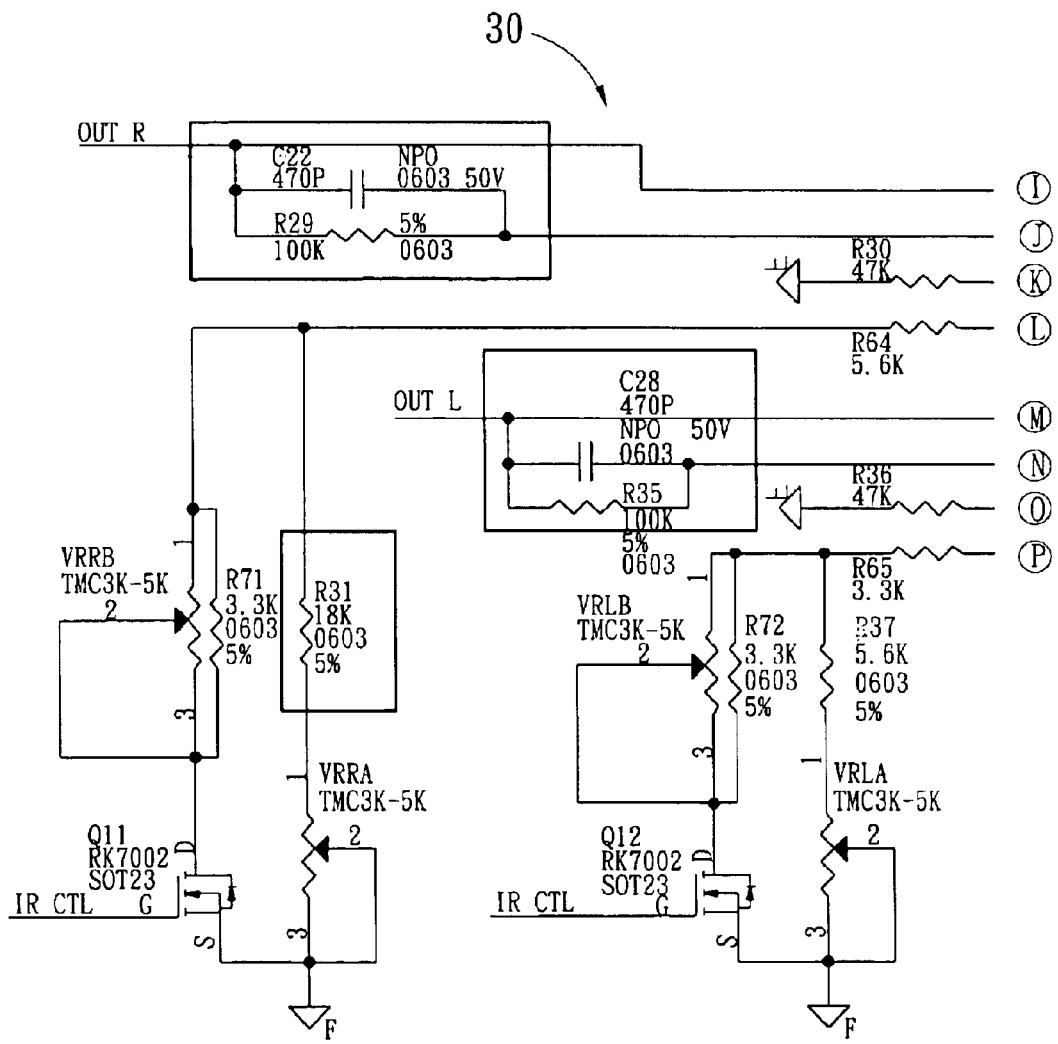
FIG. 3A is a circuit diagram of the infrared channel controller of the infrared emitter of the present invention.
Figure 3B:
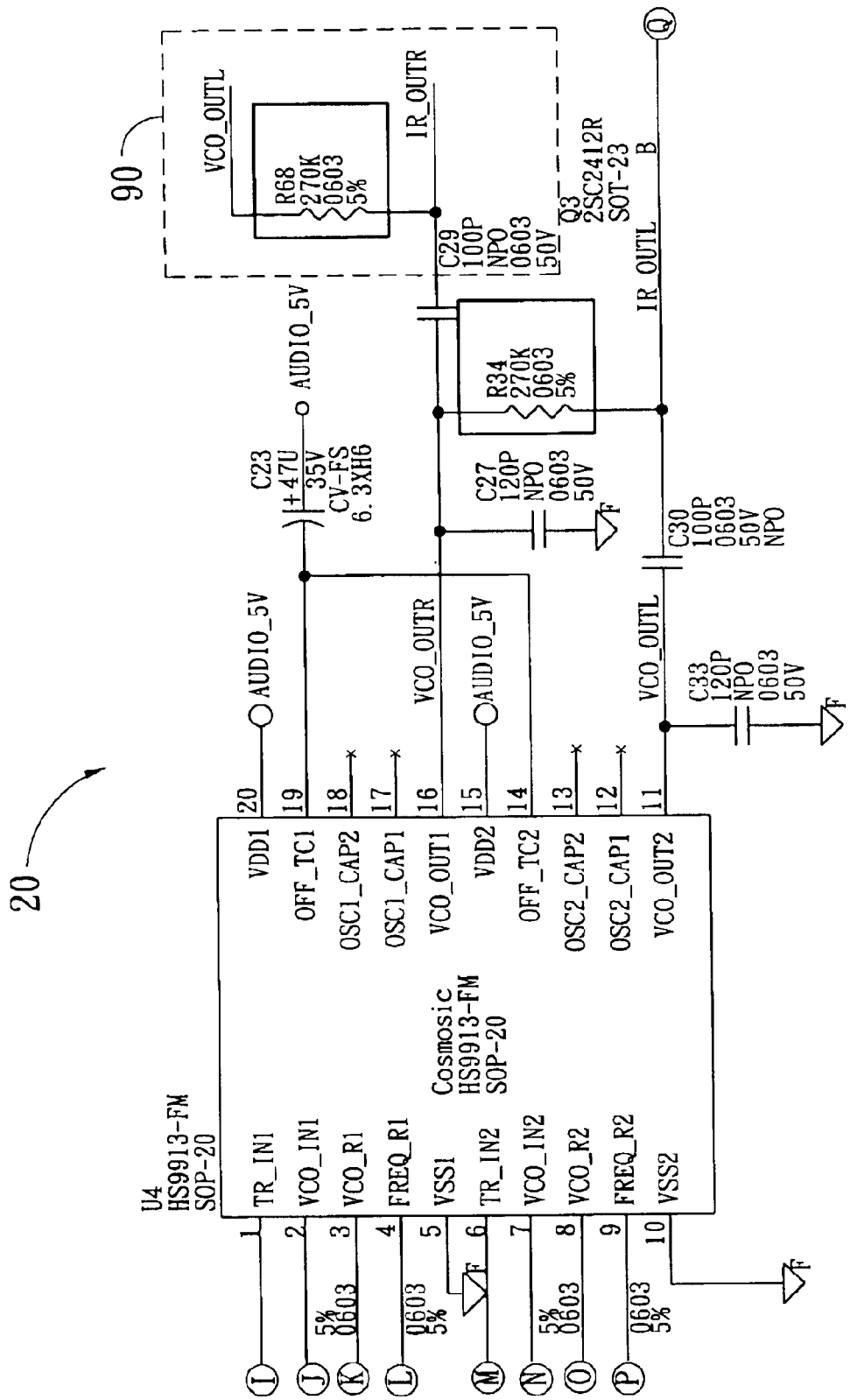
FIG. 3B is a circuit diagram of the infrared RF emitter of the infrared emitter of the present invention.
Figure 3C:
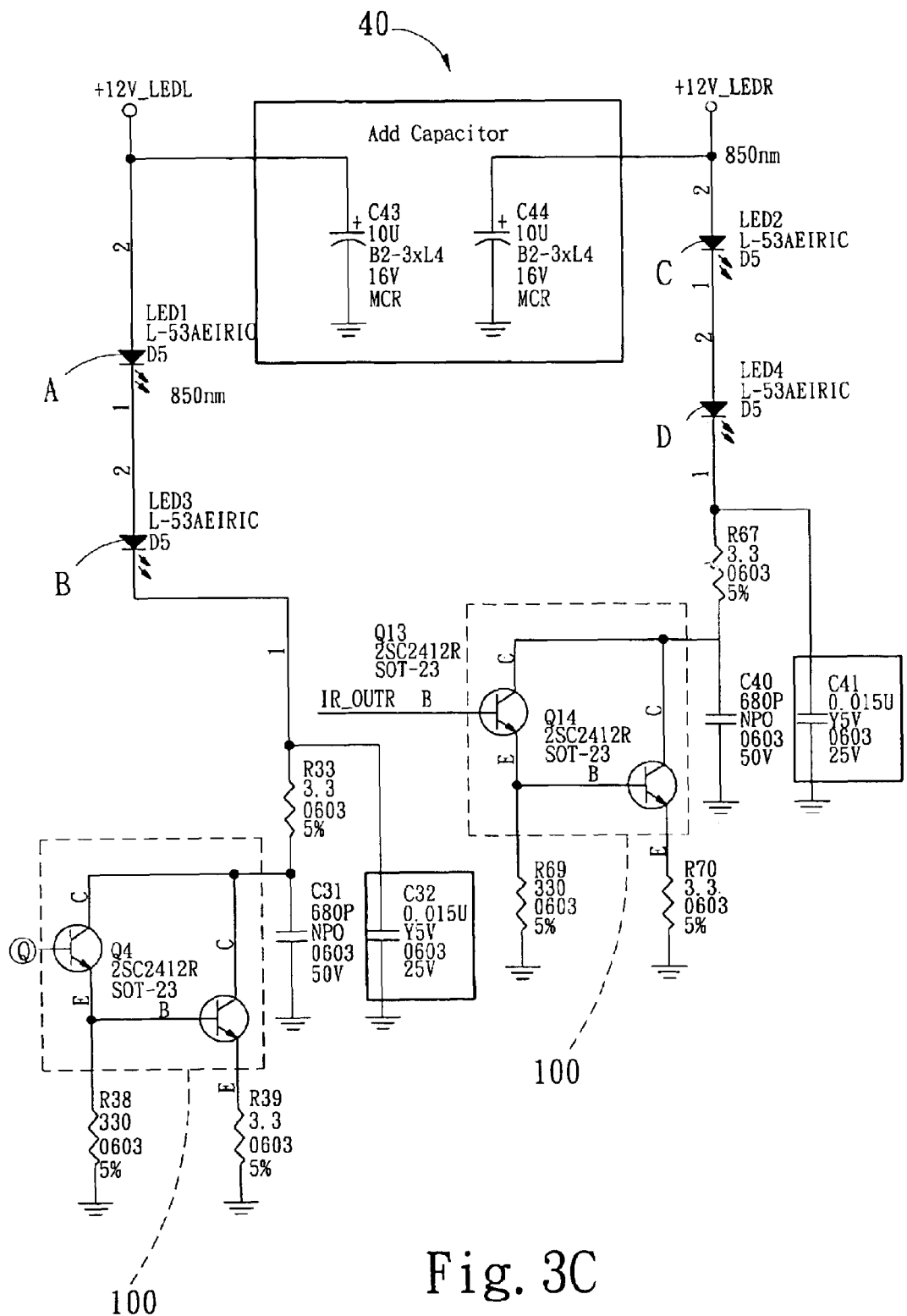
FIG. 3C is a circuit diagram of the photodiode emitting-medium of the infrared emitter of the present invention.

Referring to FIGS. 1–3C in the drawings, the infrared emitter 1 of the present invention comprises a preamplifier 10, an infrared RF emitter 20, an infrared channel controller 30 and a photodiode emitting-medium 40. The points I, J, K, L, M, N, O, and P shown in FIG. 3A are connected to the corresponding points I, J, K, L, M, N, O, and P shown in FIG. 3B; and the point Q shown in FIG. 3C is connected to the corresponding point Q shown in FIG. 3B.

Figure 1:
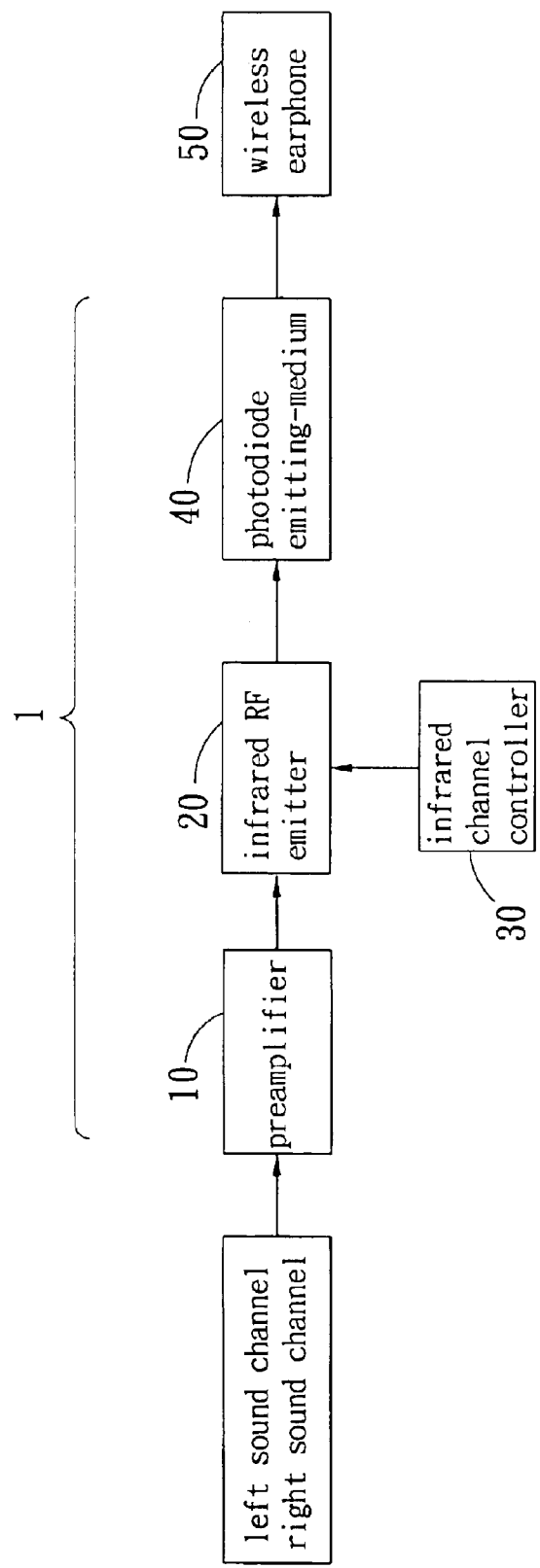
FIG. 1 is a block diagram showing the process flow of an infrared emitter of the present invention.

As shown in FIGS. 1, 2A and 2B, one end of the preamplifier 10 receives the input source of sounds of left sound channel and right sound channel, the other end amplifies and emits the sounds of the left sound channel and right sound channel; the points E, F, G and H shown in FIG. 2A are connected to the corresponding points E, F, G and H shown in FIG. 2B.

As shown in FIGS. 1 and 3B, the infrared RF emitter 20 includes a channel A, a channel B and two set of mixers 90, the channel A includes a left sound channel of 2.3 MHz and a right sound channel of 2.8 MHz; the channel B includes a left sound channel of 3.2 MHz and a right sound channel of 3.8 MHz; one end of the infrared RF emitter 20 is used to receive amplified sounds of the left sound channel and right sound channel of the preamplifier; the other end is used to emit the sounds of the left sound channel and right sound channel wirelessly in a mode of FM carrier wave.

As shown in FIGS. 1, 3A and 3B, the infrared channel controller 30 is connected with the infrared RF emitter 20 for switching between the channel A and the channel B in the infrared RF emitter 20.

As shown in FIGS. 1, 3B and 3C, the photodiode emitting-medium 40 is used to receive and emit the sounds of the channel A and the channel B emitted from the infrared RF emitter 20, the photodiode emitting-medium 40 includes two Darlington amplifying circuits 100 and four diodes A, B, C and D, wherein the diodes A, B are infrared emitting diodes for left sound channel, and the diodes C, D are infrared emitting diodes for right sound channel; one of the abovementioned Darlington amplifying circuits 100 is juxtaposed with the infrared emitting diodes A, C, the other of the Darlington amplifying circuits 100 is juxtaposed with the infrared emitting diodes B, D; and the infrared emitting diode A is of 2.3 MHz, the infrared emitting diode B is of 2.8 MHz, the infrared emitting diode C is of 3.2 MHz, while the infrared emitting diode D is of 3.8 MHz.

As shown in FIGS. 1–3C, in operation of the present invention, one end of the preamplifier 10 receives the input source of sounds of its left sound channel and right sound channel in the first place, then the other end amplifies and emits the sounds of the left sound channel and right sound channel to the infrared RF emitter 20. One end of the infrared RF emitter 20 is used to receive the amplified sounds of the left sound channel and right sound channel from the preamplifier 10; and by using an integrated circuit of the infrared channel controller 30, i.e., by switching between the channel A and the channel B which are of FM in the infrared RF emitter 20 in a mode of controlling the values of impedances, the channel A includes the left sound channel of 2.3 MHz and the right sound channel of 2.8 MHz, the channel B includes the left sound channel of 3.2 MHz and the right sound channel of 3.8 MHz. Thereafter, the other end of the infrared RF emitter 20 is used to emit the sounds of the left sound channel and right sound channel wirelessly in a mode of FM carrier wave to the photodiode emitting-medium 40. Wherein arrangement of the parts of the circuit of the photodiode emitting-medium 40 is as below:

As shown in FIGS. 3B and 3C, with the two Darlington amplifying circuits 100 and four diodes A, B, C and D, wherein the diodes A, B are infrared emitting diodes for left sound channel, and the diodes C, D are infrared emitting diodes for right sound channel; one of the abovementioned Darlington amplifying circuits 100 is juxtaposed with the infrared emitting diodes A, C, the other of the Darlington amplifying circuits 100 is juxtaposed with the infrared emitting diodes B, D; and the infrared emitting diode A is of 2.3 MHz, the infrared emitting diode B is of 2.8 MHz, the infrared emitting diode C is of 3.2 MHz, while the infrared emitting diode D is of 3.8 MHz; also two set of mixers 90 are used to control energy adjustment of the diodes A and B (2.3 MHz, 2.8 MHz), or C and D (3.2 MHz, 3.8 MHz), thereby a function that crosstalk phenomenon of abnormal channels can be gotten rid of is effected in lieu of the function of the two emitters used in a conventional way.

As stated above, the two Darlington amplifying circuits 100 and four diodes A, B, C and D in the photodiode emitting-medium 40 are arranged in the above stated way, so that energy can be uniformly distributed, and one end of the photodiode emitting-medium 40 is used to receive the sounds of the channel A and the channel B emitted from the infrared RF emitter 20, and generation of crosstalk can be inhibited when the other end transmits the carrier waves to a wireless earphone 50.

Thereby, the present invention has the following advantages:

1. By the fact that the present invention only uses one infrared RF emitter and four infrared emitting diodes, material used is less, and the cost of production is lower, this more meets the requirement that electronic products are to be light, thin and small.
2. Arrangement of the two Darlington amplifying circuits and four infrared emitting diodes on the parts of the photodiode emitting-medium can render distribution of energy uniform, and generation of crosstalk can be effectively inhibited when in transmitting the carrier waves.

In conclusion, the present invention can achieve the expected objective thereof to provide an infrared emitter with industrial value of utilization.

The above statement given is only for illustrating the present invention, and not for giving any limitation to the scope of the present invention. It will be apparent to those skilled in this art that various modifications or changes without departing from the spirit of this invention shall also fall within the scope of the appended claims.

What is claimed is:

1. An infrared emitter, being used as an emitting source of a stereophonic amplifier with left sound channel and right sound channel, comprising:

a preamplifier of which one end is an input source of its left sound channel and right sound channel, and of which the other end amplifies and emits sounds of said left sound channel and right sound channel;

an infrared RF emitter including a channel A, a channel B and two set of mixers, said channel A includes a left sound channel of a first frequency and a right sound channel of a third frequency; said channel B includes a left sound channel of a second frequency and a right sound channel of a fourth frequency; one end of said infrared RF emitter is used to receive amplified sounds of said left sound channel and right sound channel of said preamplifier; the other end is used to emit said sounds of said left sound channel and right sound channel wirelessly in a mode of FM carrier wave;

an infrared channel controller connecting with said infrared RF emitter for switching between said channel A and said channel B in said infrared RF emitter; and a photodiode emitting-medium to receive and emit said sounds of the channel A and the channel B emitted from said infrared RF emitter, said photodiode emitting-medium includes two Darlington amplifying circuits and four diodes A, B, C and D, wherein said diodes A, B are infrared emitting diodes for left sound channel, and said diodes C, D are infrared emitting diodes for right sound channel; one of said Darlington amplifying circuits is juxtaposed with said infrared emitting diodes A, C, the other of said Darlington amplifying circuits is juxtaposed with said infrared emitting diodes B, D; and said infrared emitting diode A is of said first frequency, said infrared emitting diode B is of said third frequency, said infrared emitting diode C is of said second frequency, while said infrared emitting diode D is of said fourth frequency;

thereby, crosstalk disturbance during transmitting carrier waves is inhibited by switching between said channel A and said channel B with said infrared channel controller and by a mode of arrangement of said infrared emitting diodes on parts in said photodiode emitting-medium, as well as by using said two set of mixers to respectively control energy adjustment of said diodes A and B and energy adjustment of said diodes C and D.

2. The infrared emitter as claimed in claim 1, wherein said channel A and channel B of said infrared RF emitter are of FM.

3. The infrared emitter as claimed in claim 1, wherein said first frequency is 2.3 MHz, said second frequency is 3.2 MHz, said third frequency is 2.8 MHz, and said fourth frequency is 3.8 MHz.

4. The infrared emitter as claimed in claim 1, wherein said photodiode emitting-medium transmits said carrier waves to a wireless earphone.

5. The infrared emitter as claimed in claim 1, wherein said infrared channel controller switches between said channel A and said channel B in said infrared RF emitter by using an integrated circuit.

* * * * *